(12) United States Patent  
Komatsu

(10) Patent No.: US 8,361,612 B2  
(45) Date of Patent: Jan. 29, 2013

(54) WOOD POWDER-CONTAINING RESIN MOLDED PRODUCT AND METHOD FOR PRODUCING THE SAME

(76) Inventor: Michio Komatsu, Iwaki (JP)

( * ) Notice: Subject to any disclaimer, the term of this patent is extended or adjusted under 35 U.S.C. 154(b) by 0 days.

(21) Appl. No.: 13/381,362

(22) PCT Filed: Jun. 7, 2010

(86) PCT No.: PCT/JP2010/059593  
§ 371 (c)(1), (2), (4) Date: Dec. 28, 2011

(87) PCT Pub. No.: WO2011/001791  
PCT Pub. Date: Jan. 6, 2011

(65) Prior Publication Data  
US 2012/0094109 A1 Apr. 19, 2012

(30) Foreign Application Priority Data  
Jun. 29, 2009 (JP) .................................. 2009-153439  
Jun. 29, 2009 (JP) .................................. 2009-153440

(51) Int. Cl.  
*B32B 3/26* (2006.01)  
*B29C 44/12* (2006.01)

(52) U.S. Cl. ............... 428/316.6; 428/315.5; 428/315.7; 428/318.8; 264/45.3

(58) Field of Classification Search ............... 428/316.6, 428/315.5, 315.7, 319.3, 319.7, 317.9; 264/45.3  
See application file for complete search history.

(56) References Cited

U.S. PATENT DOCUMENTS  
2008/0070998 A1 * 3/2008 Takada et al. ............... 521/50.5

FOREIGN PATENT DOCUMENTS

| JP | 2001-179903 | 7/2001 |
| JP | 2001-270958 | 10/2001 |
| JP | 2002-331542 | 11/2002 |
| JP | 2003-193586 | 7/2003 |
| JP | 2003-266469 | 9/2003 |
| JP | 2004-017285 | 1/2004 |
| JP | 2007-130826 | 5/2007 |
| JP | 2008-024914 | 2/2008 |

* cited by examiner

*Primary Examiner* — Hai Vo  
(74) *Attorney, Agent, or Firm* — Paul A. Guss

(57) ABSTRACT

A wood powder-containing resin molded article which can be reduced in weight by reducing an amount of thermoplastic resin, and also has excellent mechanical strength, and a method for producing the same are provided. A wood powder-containing resin molded article 1 is made of a thermoplastic resin containing wood powder, and includes a non-foamed layer 2 formed on a surface and a foamed layer 3 formed in an inner portion. The foamed layer 3 includes, in order from a side close to the surface, a first foamed layer 3a, a second foamed layer 3b having cells with a smaller average pore size than those of the first foamed layer 3a, and a third foamed layer 3c having cells with a larger average pore size than those of the first foamed layer 3a. The wood powder-containing resin molded article 1 contains a perfuming component.

4 Claims, 3 Drawing Sheets

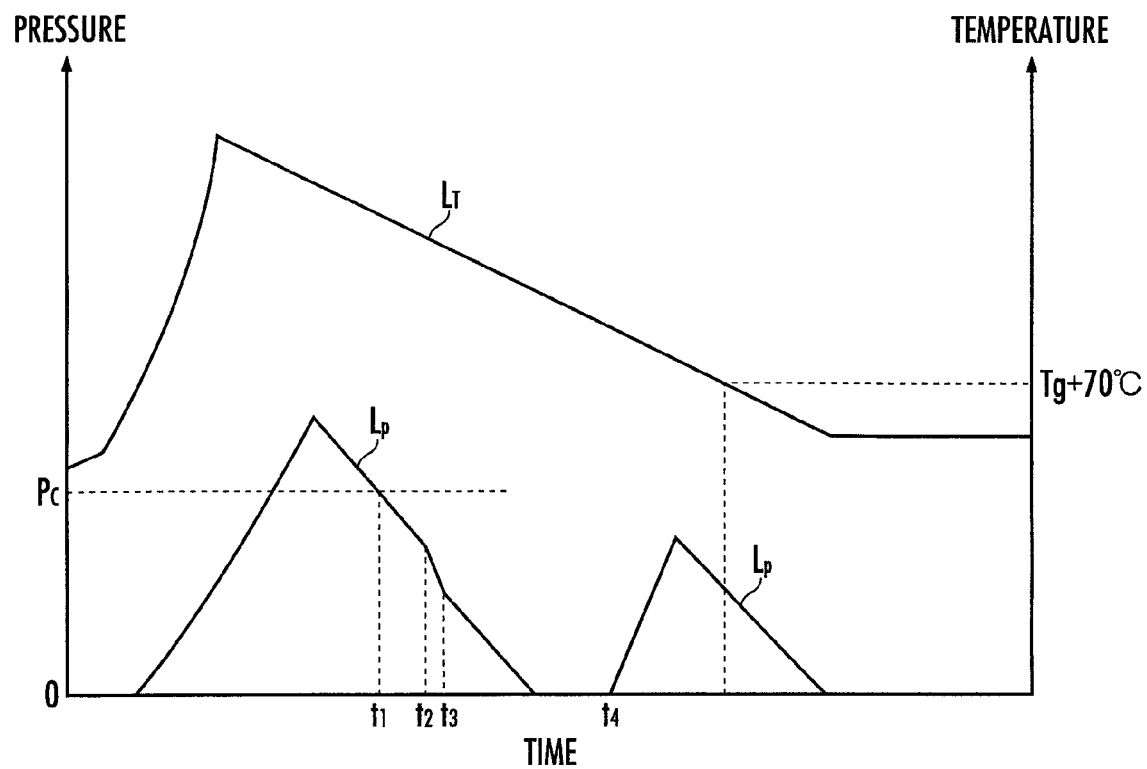

WOOD POWDER-CONTAINING RESIN MOLDED PRODUCT AND METHOD FOR PRODUCING THE SAME

TECHNICAL FIELD

The present invention relates to a resin molded article containing wood powder, and a method for producing the same.

BACKGROUND ART

Recently, a wood powder-containing resin molded article obtained by allowing a thermoplastic resin such as polyethylene and polypropylene to contain wood powder of Hinoki (*Chamaecyparis obtusa*), Sugi (*Cryptomeria japonica*) or the like has been studied. Since the wood powder-containing resin molded article contains the wood powder, an amount of thermoplastic resin can be reduced. When a predetermined amount or more of wood powder is contained, the wood powder-containing resin molded article can be incinerated as general waste. However, there is a problem that, as the thermoplastic resin has a higher wood powder content ratio, the thermoplastic resin has a lower fluidity in a molten state, and is difficult to directly injection-mold.

To solve the above problem, there has been proposed a technique of performing injection molding by allowing a thermoplastic resin composition such as polyethylene and polypropylene in a molten state to contain wood powder and also impregnating a fluid in a supercritical state into the thermoplastic resin composition under pressure (for example, see Patent Literature 1).

With the technique, a fluidity of the thermoplastic resin composition in a molten state can be improved by impregnating the fluid in a supercritical state. Thus, the injection molding can be performed even when the thermoplastic resin has a high wood powder content ratio.

Meanwhile, when a pressure of the thermoplastic resin into which the fluid in a supercritical state is impregnated is reduced to become equal to or less than a supercritical pressure of the fluid after the thermoplastic resin is injected into a cavity, the fluid is foamed, to thereby form a foamed layer having fine cells inside the obtained wood powder-containing resin molded article. As a result, the obtained wood powder-containing resin molded article has the foamed layer formed in an inner portion, and a non-foamed layer formed on a surface.

Accordingly, there has been proposed to reduce a weight of the obtained wood powder-containing resin molded article by increasing a volume of the cavity to reduce the pressure of the thermoplastic resin composition, and thereby actively foaming the fluid after injecting the thermoplastic resin composition in a molten state into the cavity.

CITATION LIST

Patent Literature

Patent Literature 1: Japanese Patent Laid-Open No. 2008-24914
Patent Literature 2: Japanese Patent Laid-Open No. 2001-270958

SUMMARY OF INVENTION

Technical Problem

In the wood powder-containing resin molded article, however, when the volume of the cavity is increased to reduce the pressure of the thermoplastic resin composition, the cells in the foamed layer may partially enormously increase in size, to cause a problem that sufficient mechanical strength cannot be obtained.

To solve the problem, it is an object of the present invention to provide a wood powder-containing resin molded article which can be reduced in weight by reducing an amount of thermoplastic resin, and also has excellent mechanical strength, and a method for producing the same.

Solution to Problem

To achieve the above object, the present invention provides a wood powder-containing resin molded article made of a thermoplastic resin containing wood powder, and comprising a non-foamed layer formed on a surface and a foamed layer formed in an inner portion, wherein the wood powder-containing resin molded article contains wood powder whose average particle size is in a range of 1 to 1000 μm, in a range of 30 to 70 mass parts per 100 mass parts of the thermoplastic resin, and the foamed layer comprises, in order from a side close to the surface, a first foamed layer, a second foamed layer having cells with a smaller average pore size than those of the first foamed layer, and a third foamed layer having cells with a larger average pore size than those of the first foamed layer.

Since the wood powder-containing resin molded article according to the present invention contains the wood powder whose average particle size is in the above range in the amount in the above range, a resin amount of the thermoplastic resin can be reduced. Since the wood powder-containing resin molded article according to the present invention also comprises the first to third foamed layers, a weight thereof can be reduced, and excellent mechanical strength can be obtained by preventing the cells from enormously increasing in size.

Conventionally, a resin molded article containing a perfuming component has been known as a resin molded article which is made of a thermoplastic resin, used for furniture, frames of electric appliances or the like, and has a fragrance emitting function. The resin molded article is expected to allow a user to recognize the perfuming component as a fragrance by emitting the perfuming component.

As the resin molded article, a resin molded article comprising a foam having interconnected cells through which a perfuming component can be exposed to outside atmosphere has been proposed (for example, see Patent Literature 2). In the resin molded article having the interconnected cells, since the perfuming component is exposed to outside atmosphere through the interconnected cells, the perfuming component is very rapidly emitted. Thus, the resin molded article cannot continue to emit a fragrance.

Thus, in the present invention, the wood powder-containing resin molded article preferably contains a perfuming component in order to provide a resin molded article having excellent fragrance duration.

In the wood powder-containing resin molded article containing the perfuming component according to the present invention, the perfuming component is held in the cells of the foamed layer. The perfuming component held in the first foamed layer closest to the surface is transferred to outside through the non-foamed layer, so that the perfuming component is emitted. The perfuming component held in the third foamed layer farthest from the surface is transferred to the first foamed layer closest to the surface, so that the perfuming component continues to be emitted.

Here, since the third foamed layer has the cells with a larger average pore size than those of the first foamed layer, the third foamed layer can hold a large amount of perfuming component within the cells. Since the second foamed layer existing between the third foamed layer and the first foamed layer has the cells with a smaller average pore size than those of the first foamed layer, the perfuming component held in the third foamed layer can be inhibited from being transferred to the first foamed layer.

Accordingly, with the wood powder-containing resin molded article containing the perfuming component according to the present invention, the perfuming component can be continuously emitted outside for a long period of time. That is, excellent fragrance duration is obtained.

When the wood powder-containing resin molded article according to the present invention contains the perfuming component, at least one type of perfuming component selected from the group consisting of hinokitiol, troponoid, α-thujaplicin, γ-thujaplicin, and β-dolabrin, for example, may be used as the perfuming component.

A method for producing a wood powder-containing resin molded article according to the present invention comprises the steps of: forming a wood powder-containing thermoplastic resin composition by mixing wood powder whose average particle size is in a range of 1 to 1000 μm into a thermoplastic resin in a molten state in a range of 30 to 70 mass parts per 100 mass parts of the thermoplastic resin; impregnating a fluid in a supercritical state into the wood powder-containing thermoplastic resin composition in a range of 0.05 to 2 mass % of the wood powder-containing thermoplastic resin composition under pressure; injecting the wood powder-containing thermoplastic resin composition into which the fluid in a supercritical state is impregnated into a cavity having a predetermined shape; reducing a pressure of the wood powder-containing thermoplastic resin composition injected into the cavity at a first ratio higher than a reduction ratio of the pressure along with a decrease in a temperature of the wood powder-containing thermoplastic resin composition by increasing a volume of the cavity when the pressure of the wood powder-containing thermoplastic resin composition becomes less than a supercritical pressure of the fluid; reducing the pressure of the wood powder-containing thermoplastic resin composition at a second ratio lower than the first ratio by further increasing the volume of the cavity; and increasing the pressure of the wood powder-containing thermoplastic resin composition by decreasing the volume of the cavity before the temperature of the wood powder-containing thermoplastic resin composition becomes equal to or less than a temperature obtained by adding 70° C. to a glass-transition temperature Tg of the thermoplastic resin. With the producing method, the wood powder-containing resin molded article according to the present invention can be advantageously produced.

In the method for producing a wood powder-containing resin molded article according to the present invention, the wood powder-containing thermoplastic resin composition is first formed by mixing the wood powder whose average particle size is in the range of 1 to 1000 μm into the thermoplastic resin in a molten state in the range of 30 to 70 mass parts per 100 mass parts of the thermoplastic resin. If the average particle size of the wood powder is less than 1 μm, a special apparatus is required, which is not preferable. Meanwhile, if the average particle size of the wood powder exceeds 1000 μm, mixing of the wood powder into the thermoplastic resin itself becomes difficult, which is not preferable.

If a content amount of the wood powder is less than 30 mass parts per 100 mass parts of the thermoplastic resin, a resin amount of the thermoplastic resin cannot be sufficiently reduced in the wood powder-containing resin molded article according to the present invention, which is not preferable. Meanwhile, if the content amount of the wood powder exceeds 70 mass parts per 100 mass parts of the thermoplastic resin, mixing of the wood powder into the thermoplastic resin itself becomes difficult, which is not preferable.

Subsequently, the fluid in a supercritical state is impregnated into the wood powder-containing thermoplastic resin composition in the range of 0.05 to 2 mass % of the wood powder-containing thermoplastic resin composition under pressure. If an impregnation amount of the fluid in a supercritical state is less than 0.05 mass % of the wood powder-containing thermoplastic resin composition, a sufficient fluidity for injection molding cannot be imparted to the wood powder-containing thermoplastic resin composition. If the impregnation amount of the fluid in a supercritical state exceeds 2 mass % of the wood powder-containing thermoplastic resin composition, it is not possible to prevent cells from enormously increasing in size in the obtained resin molded article.

Subsequently, the wood powder-containing thermoplastic resin composition into which the fluid in a supercritical state is impregnated is injected into the cavity having a predetermined shape. Accordingly, the pressure of the wood powder-containing thermoplastic resin composition gradually drops along with the decrease in the temperature of the wood powder-containing thermoplastic resin composition itself after the pressure reaches a maximum pressure equal to or more than the supercritical pressure of the fluid in a supercritical state in the cavity. When the pressure becomes equal to or less than the supercritical pressure of the fluid in a supercritical state, the fluid is foamed to form cells, so that a first foamed layer is formed.

Subsequently, the pressure of the wood powder-containing thermoplastic resin composition injected into the cavity is reduced at the first ratio higher than the reduction ratio of the pressure along with the decrease in the temperature of the wood powder-containing thermoplastic resin composition by increasing the volume of the cavity when the pressure of the wood powder-containing thermoplastic resin composition becomes less than the supercritical pressure of the fluid. Accordingly, cells with a smaller average pore size than those of the first foamed layer are formed in the first foamed layer, so that a second foamed layer having the cells is formed.

Subsequently, the pressure of the wood powder-containing thermoplastic resin composition is reduced at the second ratio lower than the first ratio by further increasing the volume of the cavity. Here, as long as the second ratio is lower than the first ratio, the second ratio may be higher or lower than the reduction ratio of the pressure along with the decrease in the temperature of the wood powder-containing thermoplastic resin composition. Accordingly, cells in the first foamed layer inward from the second foamed layer grow to form cells with a larger average pore size than those of the first foamed layer. Some of the cells may enormously increase in size.

The pressure of the wood powder-containing thermoplastic resin composition is increased by decreasing the volume of the cavity before the temperature of the wood powder-containing thermoplastic resin composition becomes equal to or less than the temperature obtained by adding 70° C. to the glass-transition temperature Tg of the thermoplastic resin. Accordingly, some cells enormously increasing in size among the cells with a larger average pore size than those of the first foamed layer are compressed to decrease in size, so that a third foamed layer having the cells with a larger average pore size than those of the first foamed layer is formed inward from the second foamed layer. When the temperature of the wood powder-containing thermoplastic resin composition becomes equal to or less than the temperature (Tg+70° C.) obtained by adding 70° C. to the glass-transition temperature Tg of the thermoplastic resin, the wood powder-containing thermoplastic resin composition is substantially solidified. Thus, the cells enormously increasing in size cannot be decreased in size even when the volume of the cavity is decreased.

As a result, the wood powder-containing resin molded article having the above configuration can be obtained.

In the method for producing a wood powder-containing resin molded article according to the present invention, carbon dioxide or nitrogen may be used as the fluid in a supercritical state.

The method for producing a wood powder-containing resin molded article according to the present invention preferably further comprises the step of mixing the perfuming component into the thermoplastic resin in a molten state after mixing the wood powder into the thermoplastic resin in a molten state. Since the method for producing a wood powder-containing resin molded article according to the present invention comprises the step of mixing the perfuming component, the wood powder-containing resin molded article containing the perfuming component according to the present invention can be advantageously produced.

BRIEF DESCRIPTION OF DRAWINGS

FIG. 3 is a graph illustrating a method for producing a wood powder-containing resin molded article according to the present invention.

DESCRIPTION OF EMBODIMENTS

In the following, an embodiment of the present invention will be described in more detail by reference to the accompanying drawings.

Figure 1:
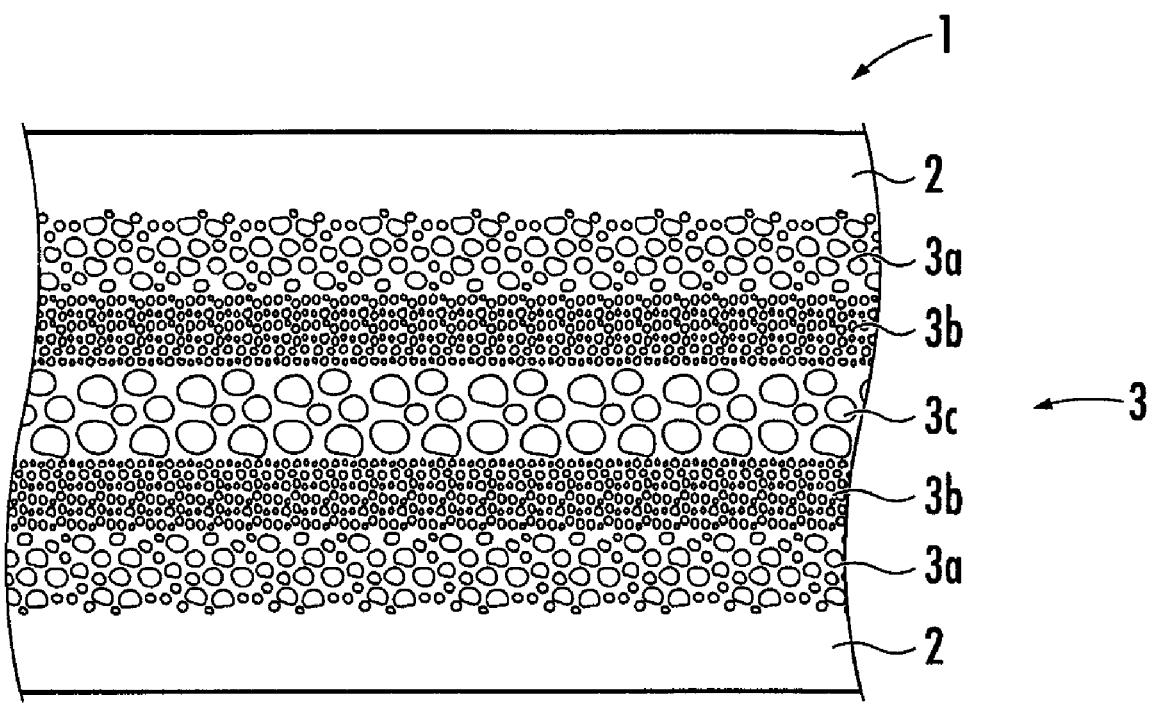
FIG. 1 is an explanatory sectional view illustrating a configuration of a wood powder-containing resin molded article according to the present invention.

As shown in FIG. 1, a wood powder-containing resin molded article 1 according to the present embodiment is made of a thermoplastic resin containing wood powder, and comprises a non-foamed layer 2 formed on a surface, and a foamed layer 3 formed in an inner portion. The foamed layer 3 further comprises, in order from a side close to the surface, a first foamed layer 3a, a second foamed layer 3b having cells with a smaller average pore size than those of the first foamed layer, and a third foamed layer 3c having cells with a larger average pore size than those of the first foamed layer.

The first foamed layer 3a has cells with an average size of 10 to 100 µm, and the second foamed layer 3b has cells with an average size of 5 to 50 µm. The third foamed layer 3c has cells with an average size of 20 to 500 µm. The average size of the cells of the foamed layer 3 can be obtained by observing a section of the wood powder-containing resin molded article 1 under an electron microscope, and calculating an average value of the maximum size of each cell, for example.

A well-known resin in itself can be used as the thermoplastic resin constituting the wood powder-containing resin molded article 1, and examples thereof include polyethylene, polypropylene, polyester, polylactic acid, thermoplastic elastomer, polystyrene, and ABS resin.

Meanwhile, as the wood powder contained in the wood powder-containing resin molded article 1, wood powder of trees such as Hinoki (*Chamaecyparis obtusa*), Sugi (*Cryptomeria japonica*), Matsu (Pine), Asunaro (*Thujopsis dolabrata*), Nioi-Hiba (*Thuja occidentalis*), Kiso-Hinoki (*Chamaecyparis obtusa* from the Kiso district), Aomori-Hiba (*Thujopsis dolabrata* var. *hondae* from Aomori District), Lawson-Hinoki (*Chamaecyparis lawsoniana*), Benihi (*Chamaecyparis formosensis*), Bei-Hiba (*Callitropsis nootkatensis*), Taiwan-Hinoki (*Chamaecyparis taiwanensis*), Numa-Hinoki (*Chamaecyparis thyoides*) and Hosoito-Sugi (*Cupressus sempervirens*) may be used. An average particle size of the wood powder needs to be in a range of 1 to 1000 µm, and preferably in a range of 10 to 500 µm in order to homogeneously mix the wood powder into the thermoplastic resin in a molten state. The wood powder can be obtained by feeding a wood chip into a ball mill and crushing the wood chip, for example.

In the wood powder-containing resin molded article 1, the wood powder whose average particle size is in the above range is contained in a range of 30 to 70 mass parts, and preferably in a range of 40 to 60 mass parts per 100 mass parts of the thermoplastic resin.

As a result, the wood powder-containing resin molded article 1 can be reduced in weight by reducing a resin amount, and excellent strength can be also obtained. The wood powder-containing resin molded article 1 has a natural wood texture, and can be used for floor materials, furniture, frames of electric appliances, automobile interior parts, bathtub covers, toilet wall materials, and kitchen materials, for example.

Next, a method for producing the wood powder-containing resin molded article 1 will be described.

Figure 2:
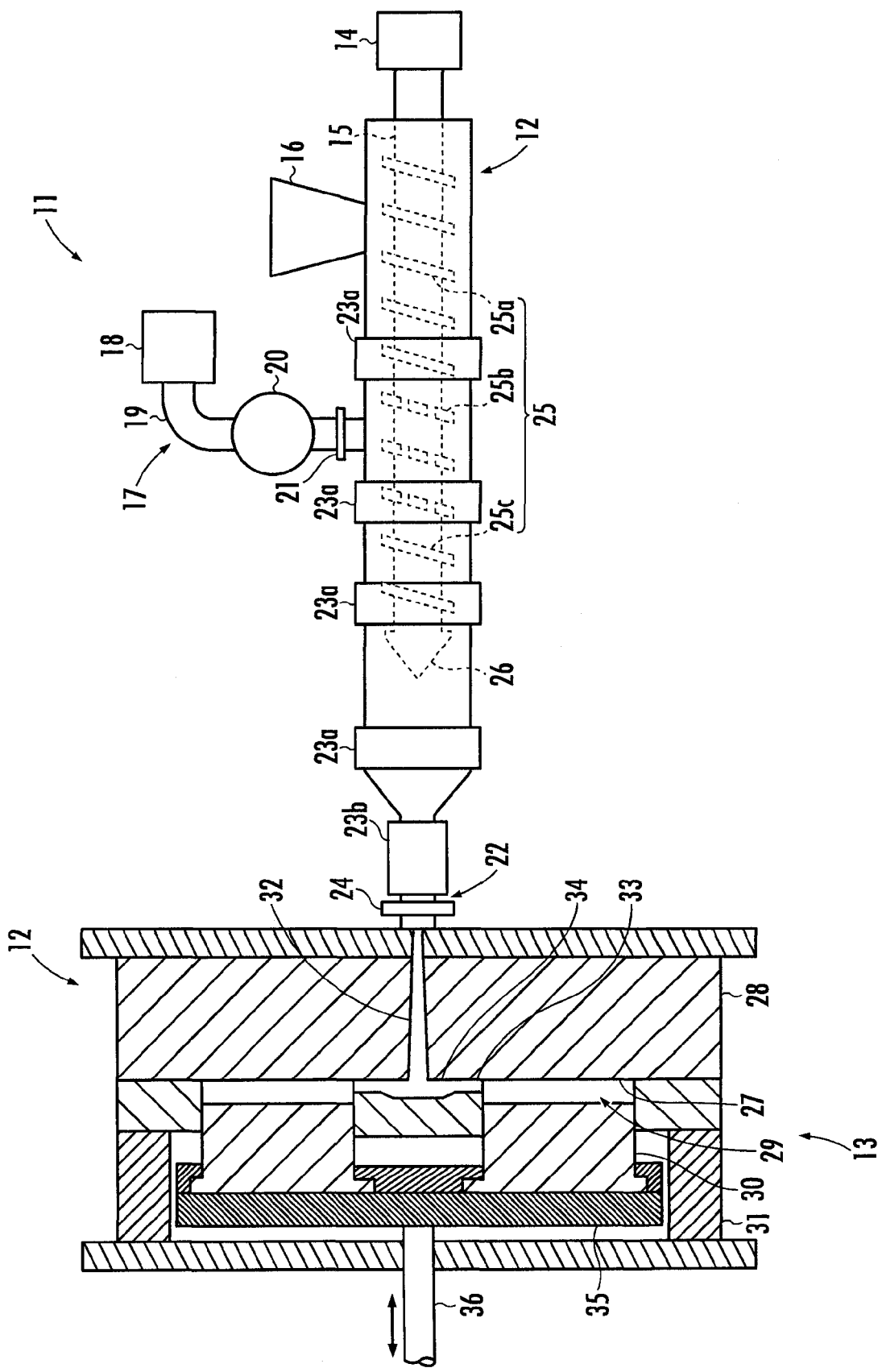
FIG. 2 is an explanatory sectional view illustrating a configuration example of an injection molding apparatus used for producing the wood powder-containing resin molded article according to the present invention.

The wood powder-containing resin molded article 1 can be produced by using an injection molding apparatus 11 shown in FIG. 2, for example.

The injection molding apparatus 11 shown in FIG. 2 comprises a cylinder 12, and a mold 13 into which the thermoplastic resin is injected by the cylinder 12. The cylinder 12 comprises therein a rotational shaft section 15 which is rotationally driven by a motor 14, and also comprises a hopper 16 from which the thermoplastic resin and the wood powder are supplied, and a supercritical fluid supply section 17 from which a fluid in a supercritical state is supplied.

The hopper 16 is provided in the vicinity of an end portion of the cylinder 12 on an opposite side from the mold 13, and the supercritical fluid supply section 17 is provided in the vicinity of a center portion of the cylinder 12 on a downstream side from the hopper 16. The supercritical fluid supply section 17 comprises a supercritical fluid generator 18 which generates a fluid in a supercritical state, a fluid conduit 19 through which the fluid in a supercritical state generated in the supercritical fluid generator 18 is conveyed toward the cylinder 12, and a meter 20 interposed in the fluid conduit 19. The fluid conduit 19 is connected to the cylinder 12 via a shutoff valve 21.

The cylinder 12 also comprises a nozzle 22 at a distal end on a side of the mold 13, and a plurality of heating devices 23a on an outer peripheral surface. The nozzle 22 comprises a heating device 23b on an outer peripheral surface, and is connected to the mold 13 via a shutoff valve 24.

The rotational shaft 15 is connected to the motor 14 at the end portion on the opposite side from the mold 13, and comprises a helical screw 25 provided on an outer peripheral surface, and a screw head 26 provided at a distal end portion on the side of the mold 13. The screw 25 comprises a proximal end continuous screw 25a, a non-continuous screw 25b, and a distal end continuous screw 25c.

The proximal end continuous screw 25a is provided in a portion from the end portion on the side of the motor 14 to before a lower portion of the supercritical fluid supply section 17 through a lower portion of the hopper 16. The non-continuous screw 25b is provided in the lower portion of the supercritical fluid supply section 17, and comprises a plurality of non-continuous portions along a circumferential direction of the rotational shaft 15. The distal end continuous screw 25c is provided between the non-continuous screw 25b and the screw head 26.

The mold 13 comprises a fixed mold 28 having a concave portion 27 shaped along an outer shape of the wood powder-containing resin molded article 1, and a movable mold 31 having a convex portion 30 fitted into the concave portion 27 to form a cavity 29. The fixed mold 28 comprises a sprue 32 in communication with the cylinder 12, and a runner 34 in communication with the sprue 32 and also in communication with the cavity 29 via a gate 33.

Meanwhile, the movable mold 31 comprises a support base 35 which supports the convex portion 30, and a piston rod 36 which reciprocates the support base 35 in a direction to and from the cavity 29. The piston rod 36 is connected to an unillustrated external driving source such as a cylinder.

The injection molding apparatus 11 can reciprocate the convex portion 30 of the movable mold 31 in the direction to and from the cavity 29 by the piston rod 36 via the support base 35 in a state in which the convex portion 30 of the movable mold 31 is fitted into the concave portion 27 of the fixed mold 28 to form the cavity 29. As a result, a volume of the cavity 29 can be increased (core back) by retracting the convex portion 30 in the direction from the cavity 29, and can be decreased (core push) by advancing the convex portion 30 into the cavity 29.

In the injection molding apparatus 11, the thermoplastic resin is first fed into the cylinder 12 from the hopper 16. The thermoplastic resin is agitated and molten by the continuous screw 25a while being heated by the heating device 23a in the cylinder 12, to thereby form a molten resin.

Subsequently, the wood powder is fed into the cylinder 12 from the hopper 16. The wood powder is fed in an amount in a range of 30 to 70 mass parts, for example, and preferably in a range of 40 to 60 mass parts per 100 mass parts of the thermoplastic resin. The wood powder may be preliminarily mixed into the thermoplastic resin to form a pellet, which may be fed into the cylinder 12 from the hopper 16.

The wood powder is agitated by the continuous screw 25a while being heated by the heating device 23a in the cylinder 12, and is thereby homogeneously mixed into the molten resin, so that a wood powder-containing thermoplastic resin composition in a molten state (abbreviated to "wood powder-containing molten resin" below) is formed. The wood powder-containing molten resin formed as described above is conveyed in a direction to the mold 13 by the continuous screw 25a.

Subsequently, the fluid in a supercritical state is supplied in a range of 0.05 to 2 mass % of the wood powder-containing molten resin from the supercritical fluid supply section 17, and impregnated into the wood powder-containing molten resin under pressure. Carbon dioxide or nitrogen may be used as the fluid.

The fluid in a supercritical state is agitated by the non-continuous screw 25b provided in the lower portion of the supercritical fluid supply section 17, and thereby sufficiently mixed and impregnated into the wood powder-containing molten resin. As a result, the fluid in a supercritical state is impregnated into the wood powder-containing molten resin in the cylinder 12 between the screw head 26 and the nozzle 22. In the wood powder-containing molten resin, nuclei for foaming has not been formed at this point.

Subsequently, the wood powder-containing molten resin into which the fluid in a supercritical state is impregnated is injected from the nozzle 22 into the cavity 29 through the sprue 32, the runner 34, and the gate 33. The cavity 29 has a predetermined volume with the convex portion 30 being advanced by a predetermined amount.

A temperature $L_T$ of the wood powder-containing molten resin increases over a predetermined time after the wood powder-containing molten resin is injected into the cavity 29, and the temperature $L_T$ then starts decreasing as shown in FIG. 3. A pressure $L_P$ of the wood powder-containing molten resin also increases along with the increase in the temperature to temporarily exceed a supercritical pressure Pc. However, after the temperature decrease starts, the pressure $L_P$ of the wood powder-containing molten resin also starts decreasing.

When the pressure $L_P$ of the wood powder-containing molten resin becomes lower than the supercritical pressure Pc at a time $t_1$ in FIG. 3, the impregnated fluid in a supercritical state is brought into a non-supercritical state to generate cells, so that the first foamed layer 3a is formed in the wood powder-containing molten resin. The non-foamed layer 2 is also formed in a portion of the wood powder-containing molten resin in contact with an inner wall of the cavity 29.

Subsequently, after passage of a predetermined time from the time $t_1$, the convex portion 30 is retracted by a predetermined amount from the cavity 29 by the piston rod 36 via the support base 35 at a time $t_2$. As a result, the volume of the cavity 29 is increased, and the pressure $L_P$ of the wood powder-containing molten resin is reduced at a first ratio higher than a reduction ratio of the pressure $L_P$ along with the decrease in the temperature $L_T$ of the wood powder-containing molten resin. The first ratio is in a range of 50 to 100 MPa/sec, for example. Accordingly, the second foamed layer 3b having cells with a smaller average pore size than those of the first foamed layer 3a is formed in the first foamed layer 3a.

Subsequently, after the operation of reducing the pressure $L_P$ of the wood powder-containing molten resin at the first ratio is performed over a predetermined time, the convex portion 30 is further retracted by a predetermined amount from the cavity 29 by the piston rod 36 via the support base 35 at a time $t_3$. As a result, the volume of the cavity 29 is further increased, and the pressure $L_P$ of the wood powder-containing molten resin is reduced at a second ratio.

The second ratio is lower than the first ratio, and in a range of 5 to 30 MPa/sec, for example. Accordingly, a layer having cells with a larger average pore size than those of the first foamed layer 3a is formed inward from the second foamed layer 3b.

Meanwhile, if the wood powder-containing molten resin is solidified directly after the operation of reducing the pressure $L_P$ of the wood powder-containing molten resin at the second ratio, the cells of the layer inward from the second foamed layer 3b enormously increase in size along with the decrease in the temperature $L_T$ of the wood powder-containing molten resin. In this case, strength of the obtained wood powder-containing resin molded article 1 may be lowered due to the cells enormously increasing in size.

To solve the problem, the convex portion 30 is subsequently advanced by a predetermined amount into the cavity 29 by the piston rod 36 via the support base 35 at a time $t_4$ before the temperature $L_T$ of the wood powder-containing molten resin becomes equal to or less than a temperature obtained by adding 70° C. to a glass-transition temperature Tg of the thermoplastic resin. As a result, the volume of the cavity 29 is decreased, and the pressure $L_P$ of the wood powder-containing molten resin is increased.

Accordingly, the cells enormously increasing in size inward from the second foamed layer 3b are compressed and decrease in size, so that the third foamed layer 3c having the cells with a larger average pore size than those of the first foamed layer 3a but no cells enormously increasing in size is formed.

The temperature $L_T$ and the pressure $L_P$ of the wood powder-containing molten resin are then naturally reduced, to solidify the wood powder-containing molten resin. The wood powder-containing resin molded article 1 having the configuration shown in FIG. 1 can be thereby obtained.

The wood powder-containing resin molded article 1 according to the present embodiment may further contain a perfuming component. To allow the wood powder-containing resin molded article 1 to contain the perfuming component, the wood powder itself may contain the perfuming component. When the wood powder does not contain the perfuming component, a well-known perfuming component in itself may be mixed into the thermoplastic resin.

Examples of the well-known perfuming component in itself include hinokitiol, troponoid, α-thujaplicin, γ-thujaplicin, and β-dolabrin. The wood powder-containing resin molded article 1 may contain one or a plurality of perfuming components.

In the wood powder-containing resin molded article 1 containing the perfuming component according to the present embodiment, the contained perfuming component is held within the cells of the foamed layer 3. The perfuming component held in the first foamed layer 3a closest to the surface is transferred to outside through the non-foamed layer 2, so that the perfuming component is emitted. The perfuming component held in the third foamed layer 3c farthest from the surface is transferred to the first foamed layer 3a closest to the surface, so that the perfuming component continues to be emitted.

Since the third foamed layer 3c has the cells with a larger average pore size than those of the first foamed layer 3a, the third foamed layer 3c can hold a large amount of perfuming component within the cells. Since the second foamed layer 3b existing between the third foamed layer 3c and the first foamed layer 3a has the cells with a smaller average pore size than those of the first foamed layer 3a, the perfuming component held in the third foamed layer 3c can be inhibited from being transferred to the first foamed layer 3a.

Accordingly, with the wood powder-containing resin molded article 1 containing the perfuming component according to the present embodiment, the perfuming component can be continuously emitted outside for a long period of time. That is, excellent fragrance duration is obtained.

The wood powder-containing resin molded article 1 containing the perfuming component according to the present embodiment can be produced by feeding the perfuming component into the cylinder 12 from the hopper 16 after feeding the wood powder into the cylinder 12 from the hopper 16 in the method for producing the wood powder-containing resin molded article 1. The perfuming component is fed in an amount in a range of 0.1 to 5 mass parts, for example per 100 mass parts of the thermoplastic resin. The wood powder and the perfuming component may be preliminarily mixed into the thermoplastic resin to form a pellet, which may be fed into the cylinder 12 from the hopper 16.

When the wood powder itself contains the perfuming component, the perfuming component may not be fed.

Reference Signs List

1 . . . Wood powder-containing resin molded article, 2 . . . Non-foamed layer, 3a . . . First foamed layer, 3b . . . Second foamed layer, 3c . . . Third foamed layer, 11 . . . Injection molding apparatus, 29 . . . Cavity.

The invention claimed is:

1. A wood powder-containing resin molded article made of a thermoplastic resin containing wood powder, and comprising a non-foamed layer formed on a surface and a foamed layer formed in an inner portion, wherein the wood powder-containing resin molded article contains wood powder whose average particle size is in a range of 1 to 1000 μm, in a range of 30 to 70 parts by mass per 100 parts by mass of the thermoplastic resin, and the foamed layer comprises, in order from a side close to the surface, a first foamed layer having cells whose average pore size is in a range of 10 to 100 μm, a second foamed layer having cells with a smaller average pore size than those of the first foamed layer which is in a range of 5 to 50 μm, and a third foamed layer having cells with a larger average pore size than those of the first foamed layer which is in a range of 20 to 500 μm, wherein the wood powder-containing resin molded article contains at least one perfuming component selected from the group consisting of hinokitiol, troponoid, α-thujaplicin, γ-thujaplicin and β-dobabrin.

2. The wood powder-containing resin molded article according to claim 1, wherein the wood powder contains the perfuming component.

3. A method for producing a wood powder-containing resin molded article made of a thermoplastic resin containing wood powder, and comprising a non-foamed layer formed on a surface and a foamed layer formed in an inner portion, the foamed layer comprising, in order from a side close to the surface, a first foamed layer having cells whose average pore size is in a range of 10 to 100 μm, a second foamed layer having cells with a smaller average pore size than those of the first foamed layer which is in a range of 5 to 50 μm, and a third foamed layer having cells with a larger average pore size than those of the first foamed layer which is in a range of 20 to 500 μm, comprising the steps of:

forming a wood powder-containing thermoplastic resin composition by mixing wood powder whose average particle size is in a range of 1 to 1000 μm into a thermoplastic resin in a molten state in a range of 30 to 70 parts by mass per 100 parts by mass of the thermoplastic resin;

impregnating a fluid in a supercritical state into the wood powder-containing thermoplastic resin composition in a range of 0.05 to 2 mass percent of the wood powder-containing thermoplastic resin composition under pressure;

adding at least one perfuming component to said wood powder-containing thermoplastic resin composition, said perfuming component being selected from the group consisting of hinokitiol, troponoid, α-thujaplicin, γ-thujaplicin and β-dobabrin;

injecting the wood powder-containing thermoplastic resin composition into which the fluid in a supercritical state is impregnated into a cavity having a predetermined shape;

reducing a pressure of the wood powder-containing thermoplastic resin composition injected into the cavity at a first ratio higher than a reduction ratio of the pressure along with a decrease in a temperature of the wood powder-containing thermoplastic resin composition by increasing a volume of the cavity when the pressure of the wood powder-containing thermoplastic resin composition becomes less than a critical pressure of the fluid;

reducing the pressure of the wood powder-containing thermoplastic resin composition at a second ratio lower than the first ratio by further increasing the volume of the cavity; and increasing the pressure of the wood powder-containing thermoplastic resin composition by decreasing the volume of the cavity before the temperature of the wood powder-containing thermoplastic resin composition becomes equal to or less than a temperature obtained by adding 70° C. to a glass-transition temperature Tg of the thermoplastic resin.

4. The method for producing a wood powder-containing resin molded article according to claim 3, wherein the fluid in the supercritical state is carbon dioxide or nitrogen.

* * * * *